US006877577B1

(12) United States Patent
Smith

(10) Patent No.: US 6,877,577 B1
(45) Date of Patent: Apr. 12, 2005

(54) VEHICLE ALL-WHEEL DRIVE SYSTEM

(75) Inventor: Roger Smith, 7261 Lyons Rd., Imlay City, MI (US) 48444

(73) Assignee: Roger Smith, Imlay City, MI (US)

( * ) Notice: Subject to any disclaimer, the term of this patent is extended or adjusted under 35 U.S.C. 154(b) by 18 days.

(21) Appl. No.: 10/038,326

(22) Filed: Jan. 2, 2002

(51) Int. Cl.$^7$ ............................................. B60K 17/356
(52) U.S. Cl. ....................... 180/242; 180/197; 180/308
(58) Field of Search ................................ 180/197, 242, 180/305, 307, 308

(56) References Cited

U.S. PATENT DOCUMENTS

| | | | |
|---|---|---|---|
| 3,656,570 A * | 4/1972 | Gortnar et al. ............ | 180/6.48 |
| 4,185,713 A | 1/1980 | Williams et al. | |
| 4,399,886 A * | 8/1983 | Pollman ...................... | 180/197 |
| 4,402,377 A | 9/1983 | Brooks et al. | |
| 4,874,057 A | 10/1989 | Smith | |
| 5,199,525 A | 4/1993 | Schueler | |
| 5,215,156 A | 6/1993 | Stulbach et al. | |
| 5,323,688 A | 6/1994 | Walker | |
| 5,465,806 A | 11/1995 | Higasa et al. | |
| 5,848,664 A * | 12/1998 | Kaspar ....................... | 180/308 |
| 5,887,674 A * | 3/1999 | Gray, Jr. ..................... | 180/307 |
| 6,119,802 A * | 9/2000 | Puett, Jr. .................... | 180/242 |
| 6,321,866 B1 * | 11/2001 | Prohaska .................... | 180/307 |
| 6,408,972 B1 * | 6/2002 | Rodgers et al. ............. | 180/197 |

* cited by examiner

Primary Examiner—Anne Marie Boehler
(74) Attorney, Agent, or Firm—Young & Basile, P.C.

(57) ABSTRACT

An all wheel drive system for a motor vehicle in which wheel slippage is effectively controlled and regenerative energy is effectively stored for subsequent utilization in the system. A hydraulic embodiment of the invention includes a hydraulic motor, a pump, a tank, an accumulator for storing pressurized fluid, and a device for sensing system back pressure. In response to a loss of system back pressure the pressure of the fluid being supplied to the motor is reduced and the motor discharge is directed to the accumulator, and in response to a sensed resumption of system back pressure regenerative energy from the accumulator is directed to the motor to assist in powering the motor. An electric embodiment of the invention includes an electric motor, an electric generator, a device for storing electrical energy such as a battery pack or a capacitor bank, a DC tachometer driven by the motor and operative to sense the motor power requirements, and a directional circuit switch assembly. In response to a drop in the power requirements of the motor representing wheel slippage the energy supplied to the motor is reduced; in response to a sensed overrunning condition of the motor wherein the motor is functioning as a generator the output of the generator is routed to the energy storage device; and in response to a sensed resumption of motor power requirements regenerative energy is directed from the energy storage device to the motor to assist in powering of the motor.

15 Claims, 12 Drawing Sheets

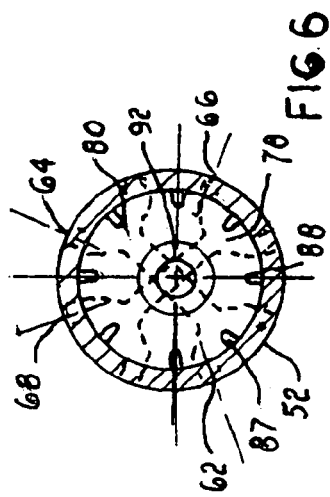
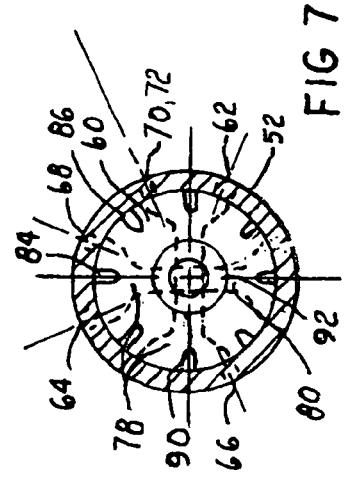
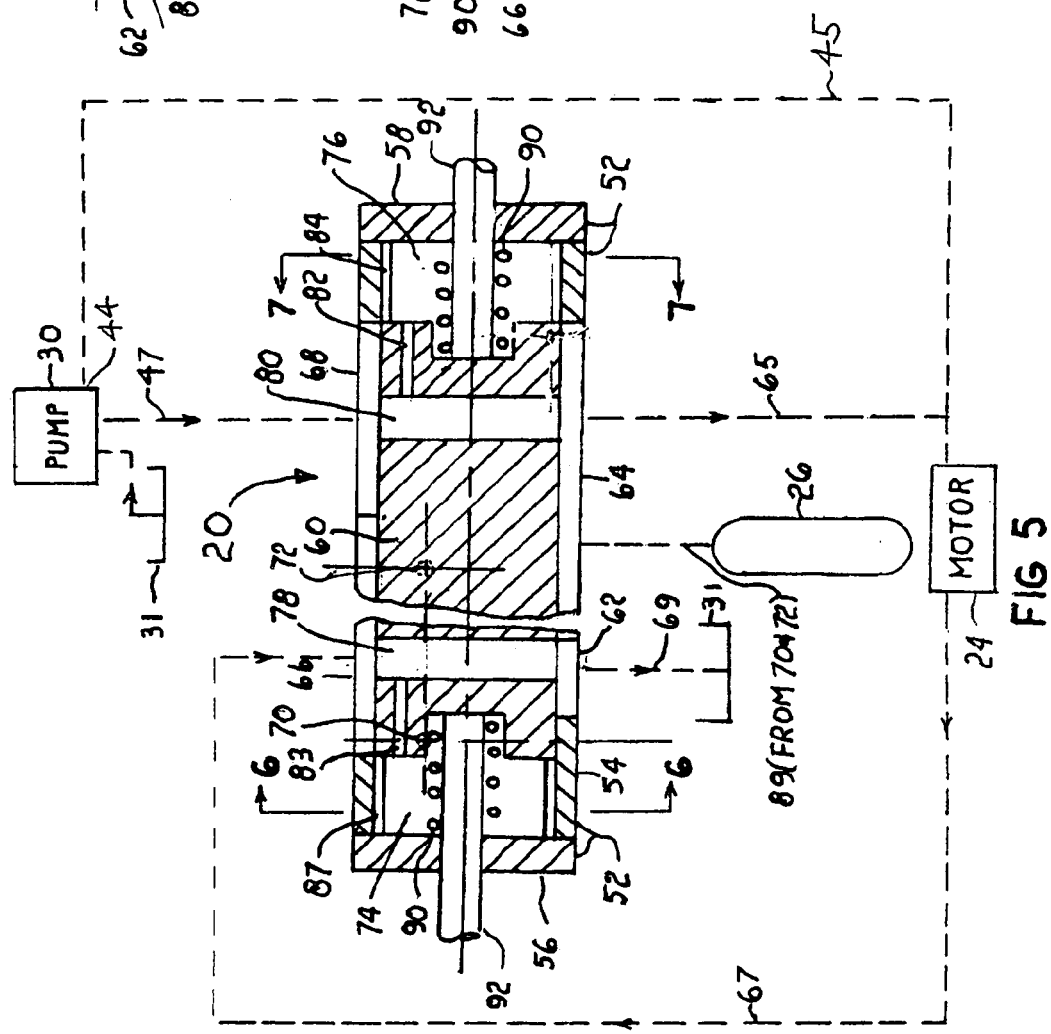

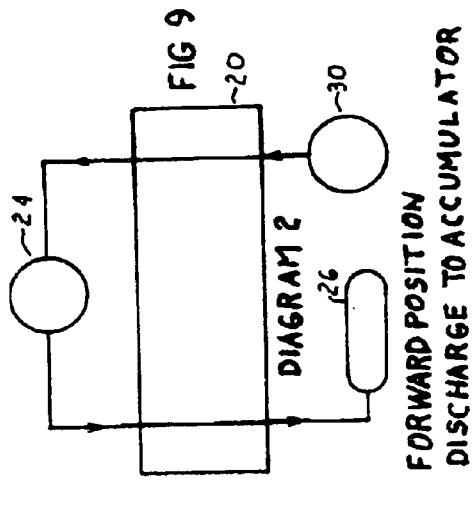
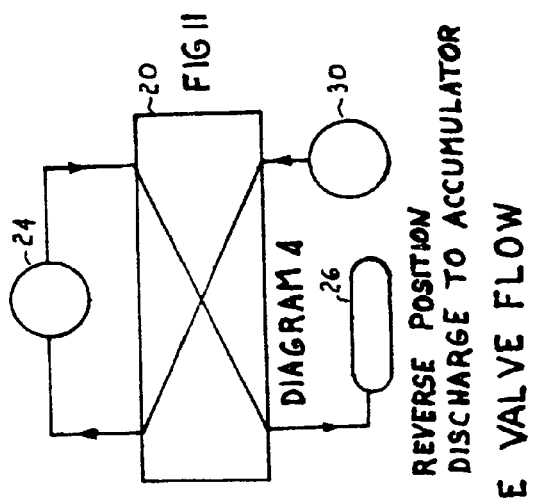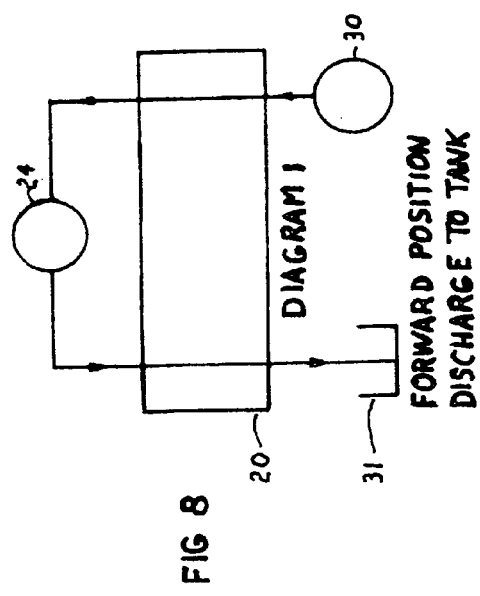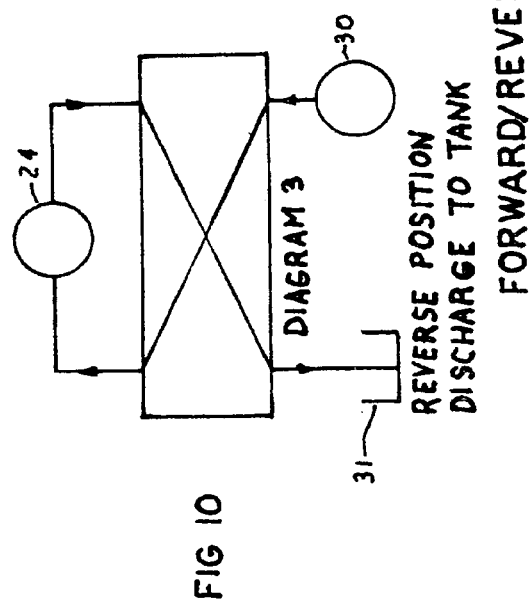
FORWARD/REVERSE VALVE FLOW

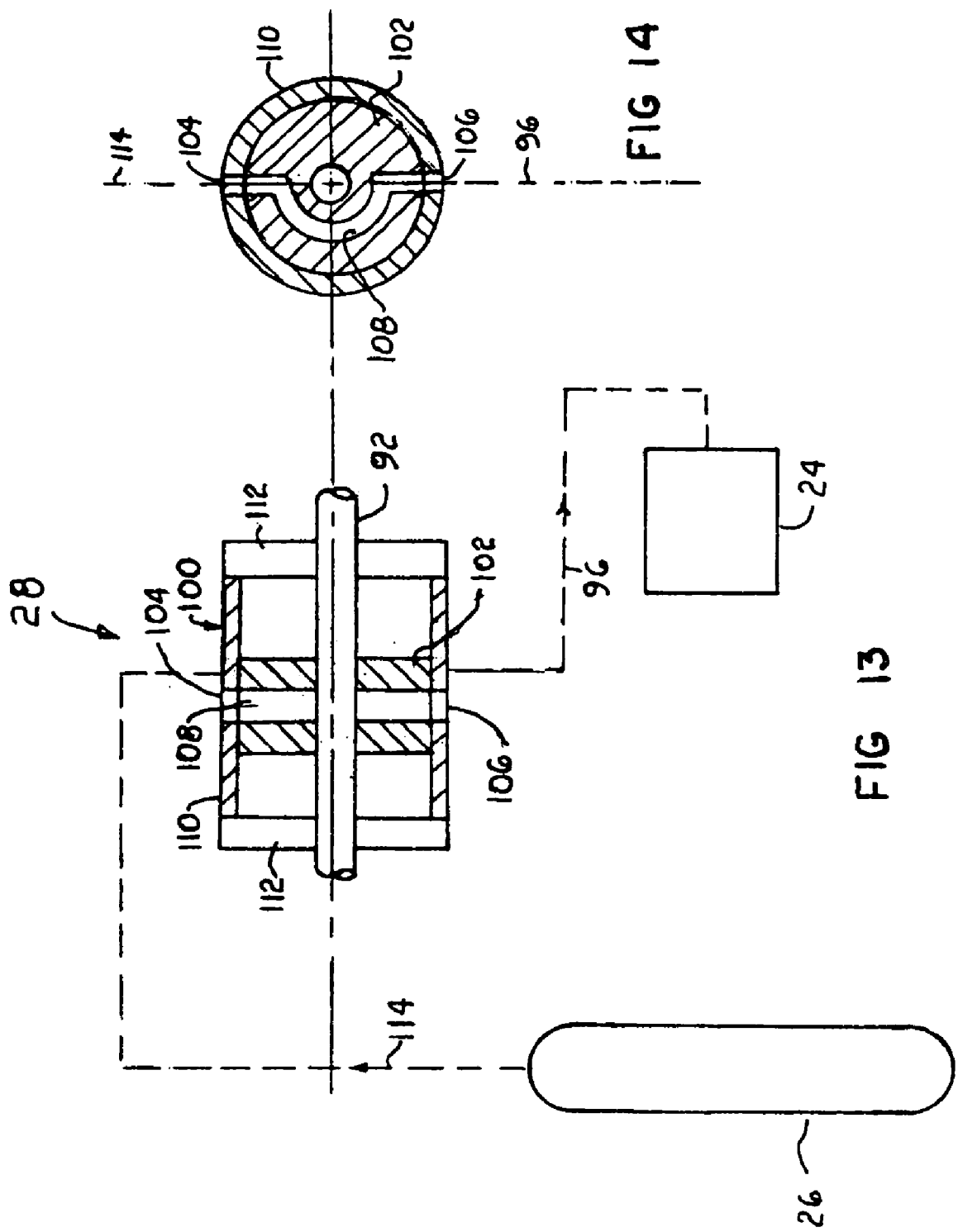

ELECTRIC POWER UNIT CIRCUIT

SCR SPEED CONTROLLER INPUTS

ELECTRIC DRIVE CIRCUIT

VEHICLE ALL-WHEEL DRIVE SYSTEM

BACKGROUND OF THE INVENTION

This invention relates to a vehicle drive system and, more particularly, to an all-wheel vehicle drive system in which each of the wheels is independently driven.

All wheel motor vehicle drive systems are inherently superior to two wheel drive systems with respect to delivering vehicle power to the road surface. However, the efficient operation of an independent all wheel drive system is dependent on maintaining traction at each of the wheels at all times since wheel slippage adversely affects the efficiency of the drive system and significantly derogates the behavior of the associated vehicle.

SUMMARY OF THE INVENTION

This invention is directed to the provision of an improved all wheel drive system.

More particularly, this invention is directed to the provision of an all wheel drive system in which wheel slippage is effectively controlled.

The motor vehicle wheel drive system of the invention is of the type including a device for generating energy, a motor receiving energy from the generating device and driving a wheel of the motor vehicle, an energy storage device for receiving energy from the motor discharge, and a directional device for directing energy flow in the system.

According to the invention, the system includes means for sensing wheel load, and the directional device is operative in response to sensed wheel load to direct the energy from the energy generating device to the motor and is operative in response to a sensed loss of wheel load to direct the motor energy discharge to the energy storage device. This arrangement facilitates the storage of energy for later regenerative use.

According to a further feature of the invention, the system further includes means operative in response to a sensed loss of wheel load to reduce the energy supply to the motor from the generating device to a level matching the wheel load requirements. This arrangement eliminates wheel slippage whereby to provide positive driving traction at each wheel at all times.

According to a further feature of the invention, the sensing means is further operative in response to sensed resumption of wheel load to direct regenerative energy from the energy storage device to the motor to assist in powering the motor. This arrangement provides a simple and effective means of utilizing the stored regenerative energy.

In a hydraulic embodiment of the invention, the motor comprises a hydraulic motor; the device for generating energy comprises a pump; the system further includes a tank; the energy storage device comprises an accumulator for storing pressurized fluid; the directional device comprises a valving device; and the load sensing means is operative to shift the valving device between a tank discharge position in which motor discharge fluid is directed to the tank and an accumulator discharge position in which motor discharge fluid is directed to the accumulator. This arrangement provides a simple and effective means of routing the fluid within the system.

According to a further feature of the hydraulic embodiment, the system further includes means operative to vary the output pressure of the pump in response to variations in the input fluid pressure to the motor. This arrangement allows the pump output pressure to be matched to the motor input pressure to minimize wheel slippage.

According to a further feature of the hydraulic embodiment, the valving device is further operative to deliver pressurized fluid from the accumulator to the motor when the motor is discharging to the tank and to prevent delivery of pressurized fluid from the accumulator to the motor when the motor is discharging to the accumulator. This arrangement further facilitates the efficient regenerative flow of fluid within the system.

According to a further feature of the hydraulic embodiment, the motor comprises a motor having separate first and second chambers, the generated pressurized fluid from the pump is delivered to the first chamber of the motor, and the stored pressurized fluid from the accumulator is delivered to the second chamber of the motor. This arrangement provides an efficient means of combining the motive power from the accumulator and the motive power from the pump. In a disclosed embodiment of the invention, the motor comprises a balanced vane type motor defining the separate first and second chambers.

According to a further feature of the hdyraulic embodiment, the pump includes a yoke mounted for pivotal movement; pivotal movement of the yoke varies the output pressure of the pump; and the pivotal aspect of the yoke is varied in response to sensed variations in motor input pressure. This arrangement provides a simple means of varying the pump output pressure to match the motor input pressure.

According to a further feature of the hydraulic embodiment, the pump includes a piston engaging one end of the yoke and the piston is exposed to motor input pressure and operates to vary the pivotal aspect of the yoke in response to variations in motor input pressure. This specific arrangement provides an efficient means of matching the pump output pressure to the motor input pressure.

In an electrical embodiment of the invention, the motor comprises an electric motor; the device for generating energy comprises an electric generator; the energy storage device comprises a device capable of storing electrical energy such for example as a battery pack or a capacitor bank; the sensing means comprises a DC tachometer driven by the electric motor; and the directional device comprises a directional circuit switch assembly. This arrangement provides a simple electrical arrangement for sensing wheel load and routing electrical energy within the system.

According to a further feature of the electrical embodiment, the directional circuit assembly includes a control switch operative with the motor in a overrunning condition to direct the motor output to the energy storage device. This arrangement provides a simple and effective means of storing regenerative energy in the electrical system.

According to a further feature of the electrical embodiment, the control switch comprises a solenoid actuated switch and the solenoid is actuated by a sensed potential difference across the motor. This arrangement provides a simple and effective means for actuating the control switch.

According to a further feature of the electrical embodiment, the system further includes a switch actuated by a brake of the vehicle and operative to direct the output of the motor to the energy storage device. This arrangement provides a simple and effective means for initiating storage of regenerative energy upon braking of the vehicle.

According to a further feature of the electrical embodiment, the directional circuit switch assembly further includes means operative to direct energy from the energy storage device to the motor when the motor is in a forward drive mode and the motor is no longer in an overrunning condition. This arrangement provides a simple and effective means of returning stored regenerative energy to the motor.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 5 is a longitudinal cross-sectional view of a forward/reverse valve utilized in the drive system;

FIGS. 6 and 7 are transverse cross sectional views taken on lines 6—6 and 7—7 of FIG. 5 in true orientation;

FIGS. 8, 9, 10, and 11 are diagramatic views showing the operation of the forward/reverse valve;

FIGS. 13 and 14 are cross-sectional views of an accumulator output directional valve employed in the drive system;

DESCRIPTION OF THE PREFERRED EMBODIMENTS

Three all wheel drive systems are disclosed. A hydraulic system is disclosed in FIGS. 1–15, a hydromechanical system is disclosed in FIG. 16, and an electrical system is disclosed in FIGS. 17–19.

Hydraulic all Wheel Drive System

Figure 1:
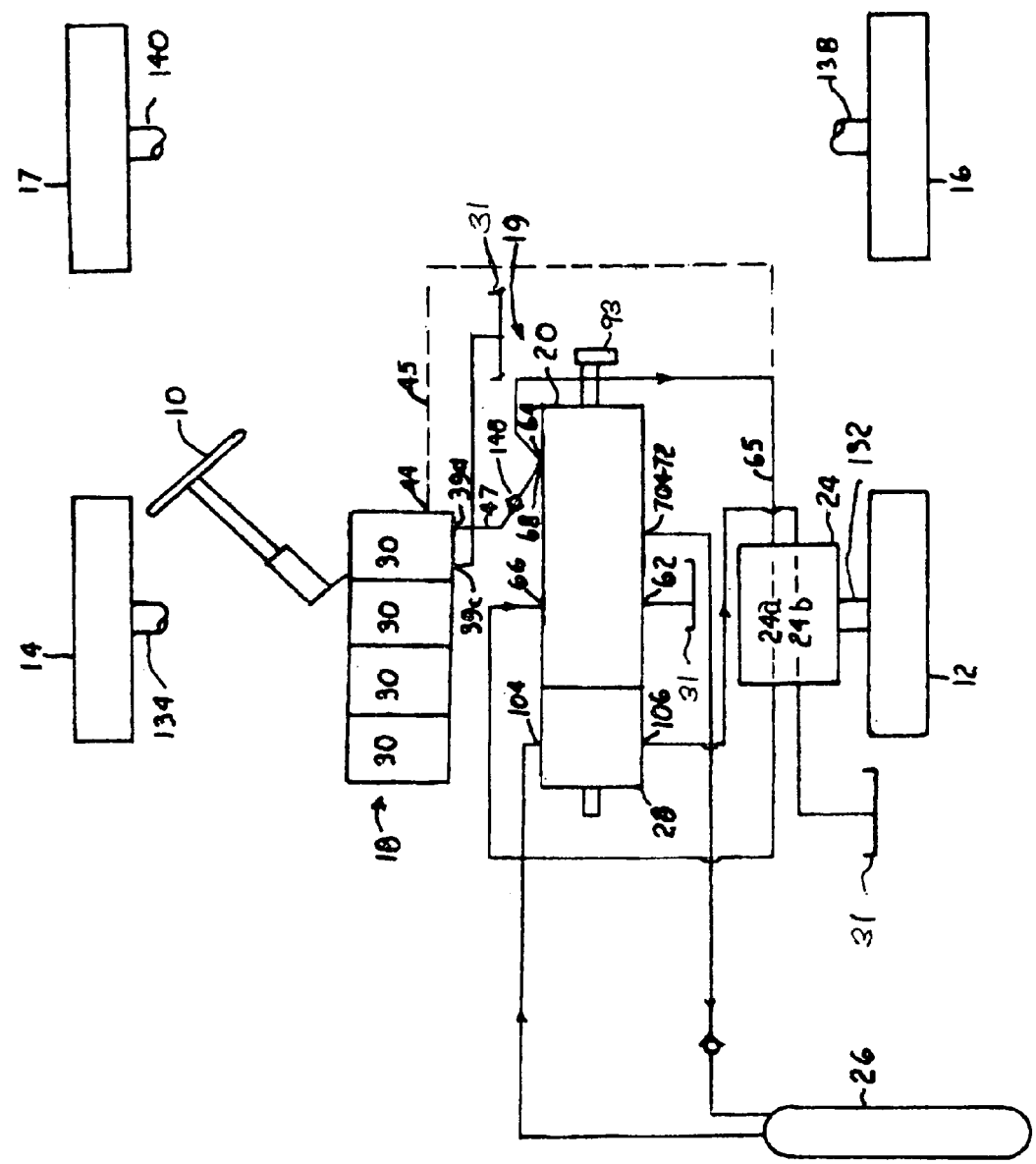
FIG. 1 is a block diagram of a hydraulic all-wheel drive system according to the invention.
Figure 2:
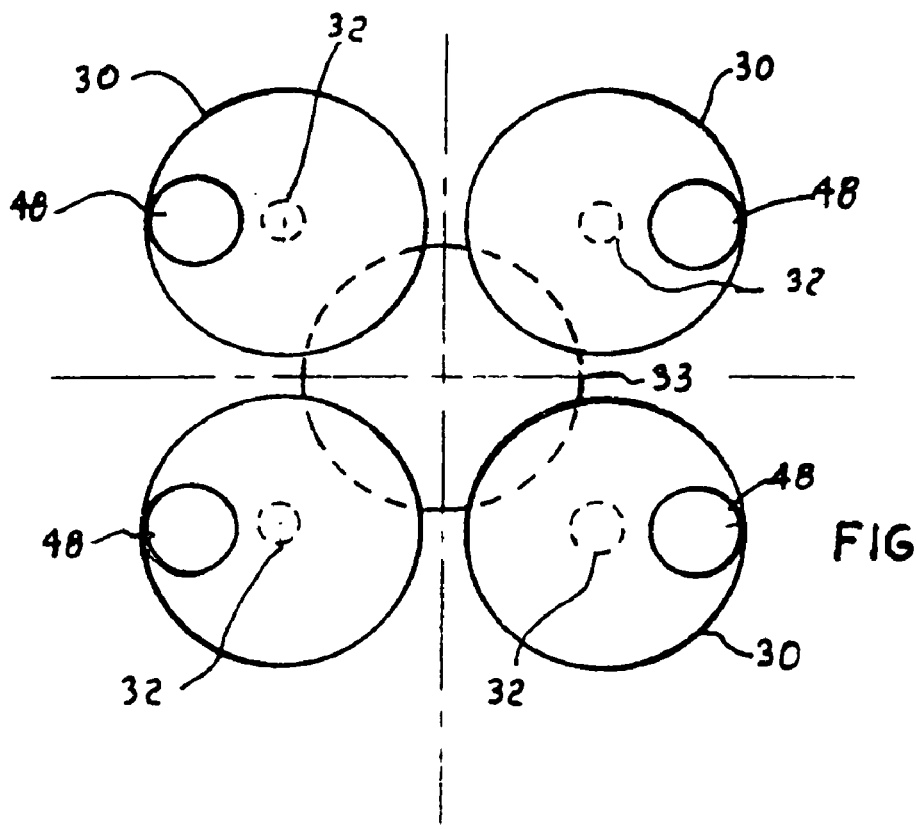
FIGS. 2 and 3 are somewhat diagrammatic views of a power unit employed in the invention all-wheel drive system.
Figure 3:
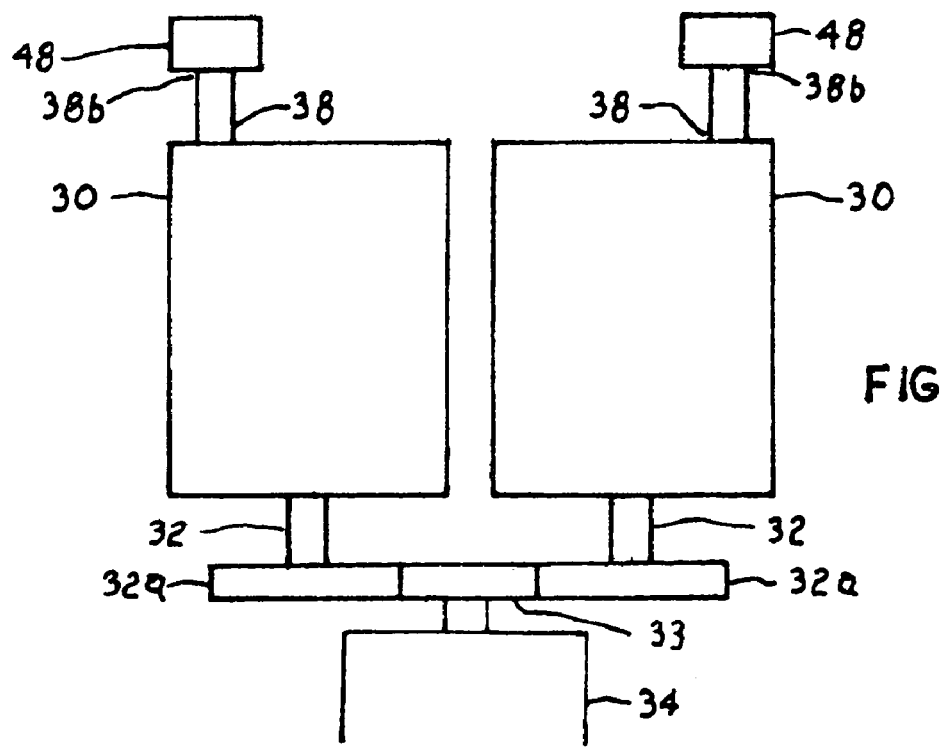

The motor vehicle shown schematically in the block diagram of FIG. 1 includes a steering wheel 10, a left front wheel 12, a right front wheel 14, a left rear wheel 16 and a right rear wheel 17.

The hydraulic drive system of the invention includes a central power unit 18 serving as the power unit for all four wheels 12, 14, 16, 17, and, for each wheel, a control unit 19 comprising a forward/reverse valve 20, a drive motor 24, an accumulator 26, and an accumulator output directional valve 28. Elements 20, 24, 26 and 28 are illustrated in FIG. 1 only with respect to the left front wheel 12, but it will be understood that a control unit 19, comprising a set of elements 20, 24, 26 and 28, is provided with respect to each wheel.

Central power unit 18 (FIGS. 2 and 3) is operative to deliver power to the drive motor of each wheel at optimum pressure and optimum flow rate. The fluid pressure changes, for each wheel, to match the traction at that wheel and the fluid flow rate is varied to vary drive motor r.p.m. for changes in speed or in turning radius when turning.

Central power unit 18 comprises an axial piston pump 30 for each wheel connected to a common tank 31 and each driven by a shaft 32 driven by a gear 32a driven by a common gear 33 powered by the vehicle engine 34.

Each pump 30 (FIG. 4) provides fluid pressure and flow rate independent of each other to the respective drive motors so that the outlet pressure of each pump matches the inlet pressure of the respective drive motor and thus matches the torque of the motor to the traction of the wheel, preventing wheel slip. Flow rate determines the speed of the vehicle and is varied to match the turning radius of the wheel when making a turn.

Each pump 30 comprises a modified axial piston pump and includes a pump yoke 35 and a ball 36 carried on and rotatable with respect to one end 35a of the yoke and internally threaded to threadably receive the inboard end 38a of an axial screw 38 slidably mounted in an end wall 39a of the pump housing 39. Pump 30 further includes a plurality of circumferentially spaced pistons 40, slidably mounted in axial bores 41a in a piston carrier 41 driven by shaft 32, and a pressure adjustment piston 42 slidably mounted in an axial housing bore 39b and including a piston rod 42a engaging the other end 35b of yoke 35 and mounting the yoke for pivotal movement about the free end of the piston rod 42a. A port 44 in housing 39 communicates with bore 39b and is operative to supply pressure fluid to piston 42 via a line 45, and a spring 46 forces yoke 35 to a minimum displacement position when piston 42 is not under pressure. A port 39c in housing end wall 39 provides communication between piston bores 41a and tank 31 and a further port 39d in housing end wall 39 provides communication between piston bores 41a and a hydraulic output line 47. A passage 39e interconnects bore 39b and port 39d. In operation, the pump is driven from the vehicle power plant via shaft 32 with constant direction. The inlet pressure from the associated drive motor 24 is experienced at port 44, since line 45, as shown, communicates with the motor inlet, while the pump outlet pressure is experienced at port 39b. Piston 42 thus adjusts axially in bore 39b until the pressures at each end of the piston are equal. Piston 42 thus acts to tilt yoke 35 until the pump outlet pressure equals the motor inlet pressure. A valve (not shown) directs the connection of line 45 to either port of motor 24 for fluid flow for either forward or reverse.

Figure 4:
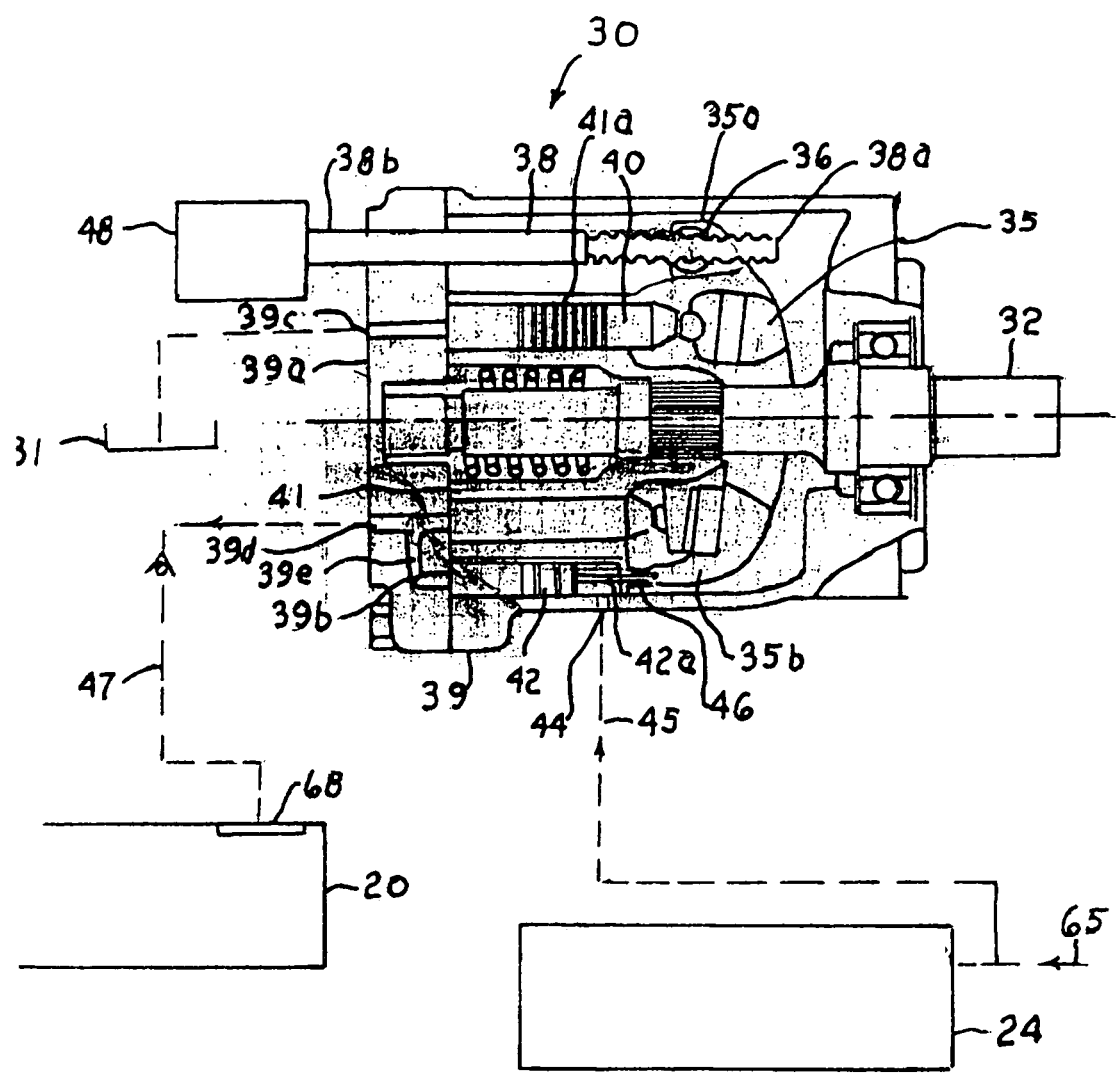
FIG. 4 is a fragmentary view of a pump employed in the power unit.

An electric motor 48 is drivingly associated with the outboard end 38b of each screw 38. In response to a vehicular turn, each motor 48 selectively activates a respective screw 38 whereby to move the yoke of the respective pump and selectively vary the flow volume of the pump. Specifically, movement of yoke end 35a to the right as seen in FIG. 4 increases the volumes of the piston bores 41a into which fluid from the tank 31 is drawn and increases the flow volume of the pump and movement of yoke end 35a to the left decreases the volume of the piston bores 41a into which fluid from the tank 31 is drawn and decreases the flow volume of the pump. A control circuit (not shown) operates in response to the revolution and direction of the vehicle steering wheel 10 to determine the direction and rotation of the respective motors 48 and thereby of the respective screws 38. In overview, turning of the steering wheel 10 selectively energizes motors 48 via the respective control circuits to selectively rotate the respective screws 38 and selectively vary the flow rate of the respective pumps in compensation for the turning movement of the vehicle and the consequent difference in the length of the path being traversed by the inboard wheels and the path being traversed by the outboard wheels.

When the vehicle is moving in a straight line with identical traction at each wheel, each pump 30 will produce the same flow rate at the same pressure. If traction at any wheel changes, the pressure at the inlet to the corresponding drive motor 24, connected through pump port 44, moves piston 42 to vary the pump pressure to match the wheel traction. As noted, if the vehicle makes a turn, each motor 48 is selectively energized via the steering wheel to turn the respective screw 38 to vary the fluid flow volume. Each pump 30 functions to determine the fluid pressure and the flow rate, independent of each other, to the respective drive motor 24 so that the output pressure of the pump matches the inlet pressure of the respective drive motor whereby to match the torque of the motor to the traction of the wheel and prevent wheel slip. Flow rate, of course, determines the speed of the vehicle and is selectively varied as noted to match the turning radius of the wheel when the vehicle is making a turn.

Forward/reverse valve 20 (FIGS. 5, 6, and 7) is operative to permit shifting from forward to reverse for the respective drive motor 24. Valve 20 also functions to shift the discharge from tank 31 to the associated accumulator 26 when the associated drive motor 24 begins to run away, for example, as when the vehicle is going down a hill, and retards the rotation of the motor until the runaway condition ceases. The valve functions in this manner in both forward and reverse directions.

Forward/reverse valve 20 comprises a two-way slidable spool valve. The valve includes a casing 52, including a cylindrical main body member 54 and end plates 56 and 58, and a spool valve 60 positioned slidably in the casing. Axially elongated ports 62, 64, 66, and 68 are provided in the casing. Port 68 communicates with hydraulic line 47 from the outlet of the associated pump 30; port 64 comprises the discharge to the associated motor 24 by a hydraulic line 65; port 66 comprises the intake from the associated motor 24 via a conduit 67; and port 62 comprises the discharge to tank 31 by a conduit 69. Ports 70 and 72 are also provided in the casing, located between the ends of the spool such that port 70 can align with port 66 in the forward direction with spool 60 to the right and port 62 blocked and port 72 can align with port 64 in the reverse direction with spool 60 to the left and port 62 blocked. Ports 70 and 72 are coupled externally in a Y configuration (not shown) that connects the motor discharge to the accumulator intake. Each branch of the Y has a check valve (not shown) preventing reverse flow.

Chambers 74 and 76 are defined in casing 52 proximate either end of spool 60 and cross bores 78 and 80 are provided in spool 60. Bore 80 aligns with ports 64 and 68 in the forward position of the spool and port 78 aligns with ports 62 and 66 in the reverse position of the spool. A passage 82 connects port 80 to chamber 76 and a passage 83 connects bore 78 to chamber 74. Stops 84 are provided on the inboard face of end plate 58 and mating slots 86 are provided in the confronting end face of spool 60. Stops 84 mate with slots 86 when the spool is in the reverse position but bear against spool 60 when the spool is in the forward position. Similarly, stops 87 are provided on the inboard face of end plate 56 and mating slots 88 are provided in the confronting end face of spool 60. Stops 87 mate with slots 88 when spool 60 is in the forward position but bear against spool 60 when spool 60 is in the reverse position. Relatively weak coil springs 90 operate to center the spool in the absence of hydraulic pressure. A shaft 92 is attached to spool 60. Shaft 92 is constrained to rotate within a 45° arc by stops (not shown) provided on right end plate 58, but is free to translate.

In the operation of valve 20, shaft 92 is rotated by the vehicle shift lever 93 (FIG. 1). Rotation of shaft 92 changes the directional flow to the associated drive motor from one causing clockwise rotation to one causing counterclockwise rotation. Initially, spool 60 will be centered by springs 90. For forward motion, the pump will cause fluid to flow via hydraulic lines 47 to port 68 and through bore 80 to port 64. From port 64, the fluid flows via hydraulic line 65 to the associated drive motor 24. The discharge fluid from the drive motor re-enters the valve through port 66 via hydraulic line 67, moves through bore 78, and moves back to tank 31 through port 62 via hydraulic line 69. When the valve is first pressurized in the forward position, fluid pressure in bore 80 (drive motor input pressure) will leak into chamber 76 through hole 82 and tend to push spool 60 to the left, but stops 87 are not aligned with slots 88 so the spool cannot shift. The pressure in bore 78 (drive motor discharge pressure) will leak into chamber 74 through hole 83. However, the pressure in bore 80 will be greater than the pressure in bore 78 so long as the drive motors are developing traction. When the drive motors begin to overrun, for example, as when the vehicle is going downhill, the drive motors will begin acting as pumps. Pressure in bore 78, and hence in chamber 74, will increase while pressure in bore 80 and chamber 76 will decrease. When the pressure in 74 (drive motor discharge pressure) is greater than the pressure in 76 (drive motor input pressure), spool 60 will shift to the right. This rightward shift is allowed by the alignment of slots 86 with stops 84. Bore 78 now lines up with port 70, diverting discharge flow from the motor to the associated accumulator 26 via hydraulic line 89.

Reverse is the opposite of forward with pump input to port 68, as with the forward position, but with motor input from port 66 and motor discharge to port 64 and then to tank 31 through port 62. Reversal of port 62 and 64 causes fluid flow in a reverse direction through the drive motor. Pressure in 74 is greater than the pressure in 76 so long as the wheel motors are developing traction. In chamber 76, slots and stops no longer align, and the spool cannot shift to the right. When the drive motor begins to overrun, pressure in 76 becomes greater than the pressure in 74. Now, slots and stops in 74 align and spool 60 shifts to the left, diverting flow from the drive motor, through ports 64, 78, and 72 to the accumulator. When the drive motor ceases to overrun, spool 60 shifts back.

Shaft 92 may be moved laterally either manually or as part of a braking system. It would normally be constrained by the shift mechanism so that the forward/reverse valve would be in neither the forward nor the reverse position. If lines to and from the drive motor are full of fluid, the rotation of the drive motor will be restricted by fluid back pressure.

Drive motor 24 (FIG. 12) functions to provide power to the vehicle wheels in forward or reverse mode, either through pump flow or accumulator flow or a mixture of the two. Motor 24 is also the means by which traction is sensed and by which drive retardation and regeneration are affected.

Figure 12:
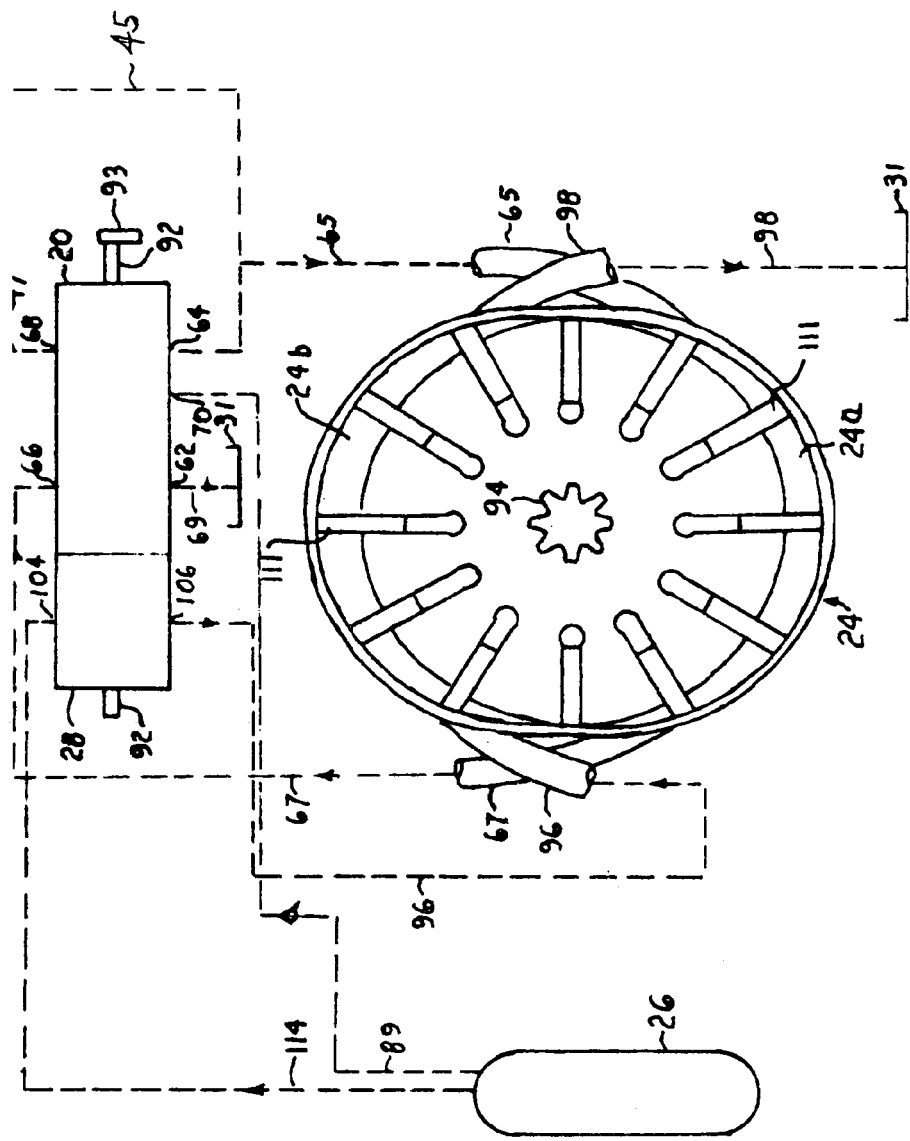
FIG. 12 is a cross sectional view of a drive motor employed in the drive system.

Drive motor 24 defines dual first and second chambers 24a and 24b and differs from a balanced sliding vane motor only in its exterior connection and in its operation. As seen in FIG. 12, clockwise rotation is for forward operation. For normal forward operation with the forward/reverse valve in the forward position, fluid will flow into chamber 24a through line 65, impact against sliding vanes 111 to turn the motor output shaft 94, and discharge through line 67. For reverse, the forward/reverse valve is shifted so that fluid flows into line 67, turns the motor counterclockwise, and flows out of line 65. For retardation, as when the vehicle is going down a hill, the drive motor will tend to act like a pump so that the drive motor discharge pressure is higher than the intake pressure. This shifts the forward/reverse valve so that the motor discharge is diverted to accumulator 26. As the pressure in the accumulator increases, below the setting on the safety relief valve, hydraulic back pressure on drive motor 24 increases, retarding the rotation of the drive motor. For regeneration, when the vehicle is no longer going down a hill, the intake pressure of the motor will increase and the discharge pressure will decrease to the point where the inlet pressure is higher than a discharge pressure. This shifts forward/reverse valve 20 so that discharge is again to tank 31. This allows regenerative fluid to flow from accumulator 26 through regenerative line 114 to accumulator output directional valve 28, through hydraulic line 96, into and through chamber 24b, and out hydraulic line 98 to tank 31.

Accumulator 26 may be of any known form and typically may comprise a container for accumulating the hydraulic fluid and including an accumulator plate overlying the fluid and maintained either by a spring or by gas at a specified pressure.

Accumulator output directional valve 28 functions to allow pressure fluid from the accumulator to flow only when the forward/reverse valve is in the forward mode and the discharge is to tank.

Accumulator output directional valve 28 (FIGS. 13 and 14) includes an outer casing 100, a rotary valve spool 102, diametrically opposed ports 104 and 106 in casing 100, and a passage 108 in the rotary valve spool 102. Casing 100 includes a tubular main body member 110 and end caps 112. Valve 28 further includes a central shaft 92 which is coincident with, and forms an extension of, the shaft 92 of forward/reverse valve 20.

In operation, since the accumulator output directional valve is mounted on the same shaft as the forward/reverse valve, it rotates and translates with the forward/reverse valve. Ports 104 and 106 and passage 108 will line up only when forward/reverse valve 20 is in the forward mode and discharges to tank 31. Flow of regenerative fluid is from the accumulator via hydraulic line 114, thence through the accumulator output directional valve, and thence via hydraulic line 96 to the motor input. When the forward/reverse valve discharges to the accumulator, spool 102 translates with the spool 60 of the forward/reverse valve so that ports 104 and 106 and passage 108 will no longer be aligned and there will be no flow through the valve.

As noted, the description thus far has been with respect to the drive system for one wheel. The units for the other wheels are identical except that wheel motors for the left side of the vehicle turn clockwise for forward motion and the drive motors for the right side turn counterclockwise for forward motion. Central power unit 14, as noted, is driven by the vehicle prime mover and is operative to direct fluid at the correct pressure and flow rate to the forward/reverse valves associated with the various wheels. A check valve 116 in the line 47 interconnecting the central power unit with the respective forward/reverse valve prevents reverse flow to the respective pump. Each forward/reverse valve is manually shifted between forward and reverse by discharging to the appropriate port of the associated drive motor. The forward/reverse valve also diverts discharge of the associated drive motor to either tank or to the associated accumulator. When the drive motor is under load, discharge is to tank. When the drive motor runs away (and acts like a pump) the forward/reverse valve shifts and discharges to the associated accumulator. Flow from the accumulator can only occur when the forward/reverse valve is in the forward direction and the motor is discharging to tank.

As previously mentioned, there is a control circuit for each wheel driven off the vehicle steering gear or steering linkage. These circuits are determined by the vehicle configuration and are within the expertise of any vehicle manufacturer. See, for example, the text on D.C. motor control circuits in Electric Motors And Control Techniques by Irving M. Gottlieb.

Figure 15:
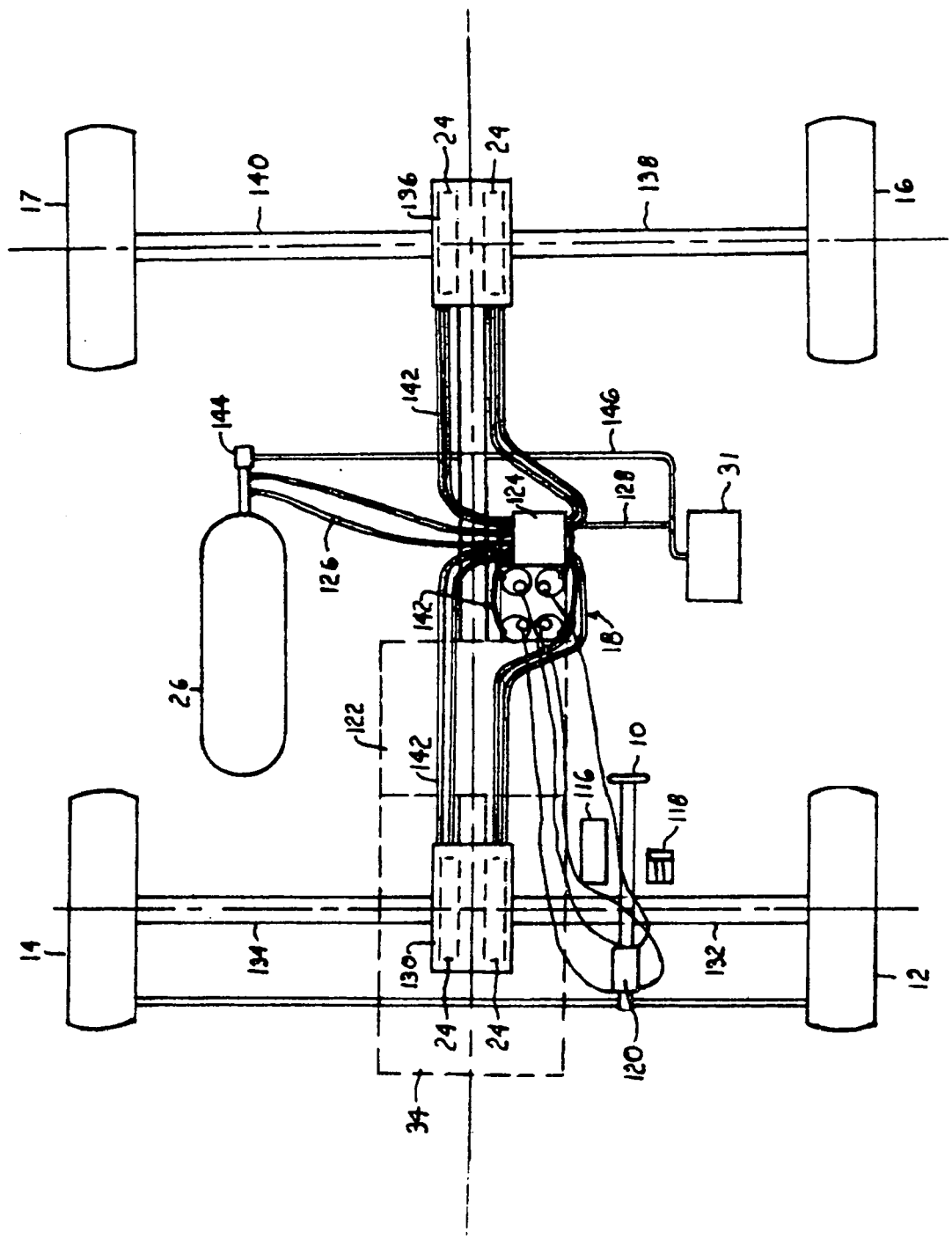
FIG. 15 illustrates a typical installation of the invention drive system in a motor vehicle.

A typical installation of the drive system of the invention in a motor vehicle is seen in FIG. 15.

The motor vehicle seen schematically in FIG. 15 includes steering wheel 10; wheels 12, 14, 16 and 17; engine 34; accelerator pedal 116; brake pedal 118; steering gear 120; and transmission 122.

The power unit 18 of the invention is mounted vertically and in driving relation to the vehicle transmission 122. The forward/reverse valves 20 and the accumulator output directional valves 28, for all four wheel assemblies, are mounted in a common manifold 124 positioned proximate power unit 18. A common accumulator 26 and a common tank 31 are connected to manifold 124 by suitable hydraulic lines 126, 128.

The drive motors 24 for front wheels 12 and 14 are housed in a forward drive casing 130 and drive wheels 12 and 14 through drive shafts 132 and 134, and the drive motors 24 for rear wheels 16 and 17 are housed in a rearward drive casing 136 and drive wheels 16 and 18 through drive shafts 138 and 140.

Hydraulic lines 142 extend between power unit 18 and manifold 124 and between manifold 124 and drive casings 130 and 136; a relief valve 144 is associated with accumulator 26; and a drain line 146 extends from relief valve 144 to tank 31.

Manifold 124 is mounted vertically and check valves, as seen at 148 in FIG. 1, are incorporated between manifold 124 and the lower manifold cover. One method of shifting the forward/reverse valves between gears, in unison, is to have the spool shafts splined, driven by a circular gear with both external and internal teeth. The exterior teeth are driven off the transmission shift gear and may not have engagement except for forward and reverse gears. There is a brake connection from below that can move the spool shaft vertically in the valve.

The operation of the drive system of the invention will now be described with respect to the manner in which the system operates in each of the various duty cycles of a modern day motor vehicle.

Acceleration Duty Cycle

In General:

Depressing the vehicle accelerator increases the Rpm of the mechanical drive and the output of the power unit. Drive motor Rpm's will tend to increase but with increased torque requirements. Power unit output will tend to increase to compensate for the increased drive motor torque requirements but will demand increased torque from the engine. In those vehicles where the power unit is driven off a transmission, which should exclude only vehicles such as golf carts, the transmission would shift to a lower gear with the drive motors tending to smooth the transition between gears. Acceleration would tend to shift the vehicle center of gravity to the rear, requiring the power units for the rear wheels to increase their power output and the power units for the front wheels to decrease their power output.

Power unit output would increase with increased engine Rpm until a wheel begins to lose traction, at which point the wheel will have reached its maximum possible acceleration. Then, the power output of the power unit will decrease to match the wheel traction. With increased vehicle momentum, torque requirements of the wheel will decrease, resulting in reduced torque requirements to the power units and to any mechanical drive, allowing the transmission to up shift.

The cycle herein described pertains to typical wheeled vehicles such as automobiles and trucks and does not rule out the feasibility of combining power unit and power storage outputs, nor does it rule out the feasibility of applying power unit output to one set of axles and power storage output to another set, such as might be found with tractor-trailer combinations.

With Respect to the Various Components of the Drive System:

Power Unit 18: Increased Rpm of the axial piston pump with increased throttle, also increased torque requirements.

Axial Piston Pump 30: Increased flow rate with increased Rpm. Piston 42, displaced by drive motor inlet pressure, varies pump outlet pressure to match the drive motor inlet pressure. As noted, acceleration may cause a shift of the vehicle center of gravity toward the rear, requiring an extra increase in outlet pump pressure for the axial piston pumps for the rear wheels and a lesser increase for those axial piston pumps for the front wheels.

Forward/Reverse Valve 20: The forward reverse valves will remain in the forward position with discharge to tank 31.

Drive Motors 24: Fluid flow and fluid pressure to a drive motor results in increased torque to overcome increased back pressure until the wheel begins to slip. Then, resistance to turning declines and along with it input pressure (fluid will free flow), the power unit will then reduce the pump fluid pressure.

Accumulator Output Directional Valve 28: There is only a possible momentary lineup of ports when the associated drive motor begins to slip.

Cruise Duty Cycle

In General:

The cruise duty cycle would be characterized by constant or slightly varying pressure on the accelerator over flat or slightly undulating terrain. During the cruise duty cycle, conditions would be essentially in a steady state with little variation in output of the power unit, little if any charging of the accumulator, and no changes of the means for direction and controlling of the power flow. There may occur brief episodes of diminished traction at any wheel due to ground conditions. These would be compensated for by lowered power outputs by the appropriate power units without any changes in vehicle motion.

With Respect to the Various Components of the Drive System:

Power Unit 18: Nearly constant Rpm to the pumps.

Axial Piston Pump 30: Nearly constant fluid flow with brief occurrences of diminished traction at individual wheels compensated by reduction in flow pressure. Flow pressures would be generally a function of weight distribution with higher flow pressures to motors bearing greater weight.

Forward/Reverse Valve 20: Spool movement should be minimal.

Drive Motors 24: Rpm would be constant to slightly varying, input pressures lowered when encountering diminished traction.

Accumulator Output Directional Valve 28: Ports are aligned so that fluid could flow from the accumulator to the motor.

Deceleration Duty Cycle

In General:

Deceleration can occur in two forms: coasting and retardation. The forms differ in how the deceleration is caused but are similar in the effects of the causes. Coasting occurs when there is insufficient pressure on the accelerator to prevent forward vehicle motion being slowed by friction and wind resistance. Retardation consists of pressing on the brake pedal with an amount of force inadequate to energize the vehicle's brakes but to divert power flow to the accumulator.

Both the mechanical drive, if any, and the power unit will experience a gradual decrease in Rpm, eventually demanding a downshift of the transmission if the engine is to be kept from stalling. Power output of the power unit will decrease in a non-linear fashion as a result of the drive motors being driven by the vehicle momentum, with the drive motors output being diverted to the accumulator, superimposed upon a reduction of decreasing engine output. If, on the other hand, the drive train is disconnected from the engine, decreases will be gradual and uniform until the vehicle eventually stops.

With Respect to the Various Components of the Drive System:

Power Unit 18: Decreased Rpm to pumps caused by decreased engine Rpm. Stepwise increase in torque with corresponding decrease in Rpm during gear changes.

Axial Piston Pump 30: Superimposed on fluid pressure and flow changes caused by gear changes will be an increase in fluid flow and a loss in fluid pressure as continuing vehicle momentum causes drive motors to begin acting as pumps.

Forward/Reverse Valve 20: As the drive motor begins acting as a pump or if light pressure is applied to the brake pedal, the spool shifts to the right and fluid discharge is to the accumulator 26 rather than to tank 31.

Accumulator Output Directional Valve 28: Since the ports of the accumulator output directional valve will not line up when the discharge is to the accumulator 26, there will be no fluid flow through the valve.

Braking Duty Cycle

In General:

The braking duty cycle differs from the deceleration duty cycle by enough pressure being applied to the brake pedal to activate the brakes as well as providing retardation. If the engine is not disconnected from the drivetrain during braking, there is a possibility of stalling, especially during panic stops. Any mechanical drive train will be somewhat cushioned, however, by the actions of the drive motors.

Pressing on the brake pedal causes the means of directing and controlling power flow to direct the output of the drive motors to the accumulator, although such output may be especially brief, especially for panic stops.

Applying the brakes also impedes, or even halts, the rotation of the wheels and, with them, the axle shafts. The cessation of rotation of the axle shaft is imparted to the drive motors. The drive motors do not stop immediately, however, providing some cushioning for the rest of the drive train. An overload condition will soon ensue in which the power input to the stalled drive motors has nowhere to go. As this overload reaches an unsafe condition, the power input to the drive motors will be diverted to tank.

With Respect to the Various Components of the Drive System:

Power Unit 18: There will be a rapid decrease in Rpm caused by a rather abrupt increase in fluid back pressure when brakes halt wheel rotation, especially during panic stops. If the engine is not disconnected, its rotary momentum will oppose such a decrease in Rpm.

Axial Piston Pump 30: There will be a rapid increase in output pressure, especially on the axial piston pumps for the front wheels, to combat the sudden increase in back pressure along with a radical decrease in fluid flow.

Forward/Reverse Valve 20: Pressing on the brake pedal applies force on the forward/reverse valve shafts and moves the spools to the right, directing flow to accumulator 26. This fluid flow will be brief since there will be no output from the stalled drive motors.

Drive Motors 24: The rapid or sudden stopping of wheel rotation will be transferred to the drive motor rotor assemblies. This will cause fluid turbulence but will provide cushioning for the rest of the drive train. The vehicle center of gravity will shift forward during braking so effects on the front drive motors, and the circuits associated with those drive motors, will be more severe.

Accumulator Output Directional Valve 28: Since the forward/reverse valve spools are forced to the left, the ports of the accumulator output directional valves will not line up.

Uphill Duty Cycle

In General:

When going uphill, a greater load is placed on the engine and, in the absence of any assistance from the accumulator, the accelerator pedal must be depressed to maintain vehicle speed, with possibly a downshifting of the transmission. If the accumulator has been charged such as by previously going down a hill, that power will assist going up the hill.

Once the engine has reached equilibrium with a constant hill grade requiring no additional increase in throttle or downshifting of the transmission, and after the excess input from the accumulator has been exhausted, the uphill duty cycle will be the same as the cruise duty cycle. The rear wheels, however, will require more torque than the front wheels.

With Respect to the Various Components of the Drive System:

Power Unit 18: Unless power is supplied by the accumulator, the power unit will require increased torque at the same Rpm to maintain a constant speed, possibly also requiring a downshift of the transmission.

Axial Piston Pump 30: Unless power is supplied by the accumulator, drive motor input pressure will displace piston 42 and increase discharge pressure. The pumps for the rear wheels will require a greater increase in pressure than those for the front wheels.

Forward/Reverse Valve 20: The forward/reverse valve will remain in the forward position with discharge to tank 31.

Drive Motors 24: The drive motors will require fluid flow at a constant rate but at an increased pressure with the rear drive motors requiring a greater pressure increase than the front motors.

Accumulator Output Directional Valve 28: Ports in the accumulator output directional valves will line up and fluid will flow from accumulator 26 to motor 24.

Downhill Duty Cycle

In General:

When going downhill, engine throttle must be decreased to maintain constant speed. Downhill momentum driving the wheels will, in turn, cause the mechanical drive to begin driving the engine. It will also cause the drive motors to act as hydraulic pumps. Drive motor output will be diverted to the accumulator producing a resistance to rotation in the drive motors, in other words a retarding action. The transmission may also downshift, providing further retardation.

With Respect to the Various Components of the Drive System:

Power Unit 18: Decreased engine throttle results in lower Rpm and torque to the power unit.

Axial Piston Pump 30: No output is required for the axial piston pumps. Decreased engine throttle results in lower output flow. Output pressure declines toward a minimum.

Forward/Reverse Valve 20: When going down a hill, the drive motor output pressure will exceed the input pressure. Pressure in chamber 74 will exceed pressure in chamber 76, the spool will move to the right, and discharge will be to the accumulator 26 through port 70.

Drive Motors 24: Fluid pressure to the drive motors will decline as the motors begin to overrun due to being driven by the vehicle momentum going downhill.

Accumulator Output Directional Valve 28: Accumulator output directional valve ports will not line up and there will be no flow through the valve.

Turn Duty Cycle

In General:

There are several steering modes used on powered wheeled vehicles today, including Ackerman steering, all wheel steering, crab steering, and skid steering. Ackerman steering is by far the most prevalent as well as the most difficult to design an all wheel drive for if wheel slip is to be avoided at maximum traction.

With Ackerman steering, in order for each wheel to rotate at an optimum rate proportional to the turning radius of that wheel when making a turn, the rotations of the front and rear wheel must be biased differently. Those of the front axle must be biased in proportion to the movement of the tie rods for the wheels on each side of the vehicle. Those of the rear axle must be biased in proportion to the angle through which the steering wheel is turned.

When making a turn, the power inputs to the power unit remain constant. The power units, however, vary the outputs to the wheels at each corner of the vehicle differently. The electronic pickups for varying the rotations of the front wheels, which are assumed to be doing the steering, are located at the points on the steering gear at which the tie rods are attached so that the outputs will be proportional to the various angle at which the wheels on either side of the vehicle turn. The electronic pickups for the rear wheels are on the steering wheel shaft as it enters the steering gear so that the outputs will be proportional to the turning radii of the rear wheels. For fly-by-wire steering, all steering actions will be by the steering control circuits.

For drive systems incorporating mechanical drive elements, changes in wheel rotations are accomplished by adding drive motor inputs to mechanical drive inputs through planetary gear sets to increase the rotations of wheels on the outside of turns. For wheels on the inside of turns, the drive motors turn in the opposite direction to decrease wheel rotation. For drive systems without mechanical drive elements, wheel rotations are controlled directly by the drive motors, those on the outside of a turn being made to rotate faster and those on the inside of the turn being made to rotate slower.

Drive control systems for other modes of steering would be similar to Ackerman, but simpler. For all wheel steering, for example, all wheels on the same side of the vehicle would rotate at the same rate, and output to the wheels would be proportional to the angle through which the steering wheel is turned.

In crab steering, all wheels rotate at the same rate, independent of the steering angle. For skid steering, the steering gear is locked out, and turning is accomplished solely by varying the rotations of the wheels on either side of the vehicle, just like steering a tracked vehicle.

With Respect to the Various Components of the Drive System:

Power Unit 18: Power to the power units would be constant, and each unit would rotate its axial piston pump 30 at the same rate.

Axial Piston Pump 30: Each axial piston pump would continue rotating in the same direction at the same Rpm as the other axial piston pumps. Each motor 48 would turn the screw 38 of its pump to an angle dictated by the input from the steering gear for that pump, thereby changing the working volume and fluid flow for that pump. The fluid pressure from each pump would be adjusted automatically by a fluid pressure tap from its associated motor intake, displacing piston 42 of the pump.

Forward/Reverse Valve 20: The forward/reverse valves would not change.

Drive Motors 24: Fluid flow to each drive motor would be different so that rotational speeds would be different.

Accumulator Output Directional Valve 28: The ports would not line up and there would be no flow through the valve.

Reverse Duty Cycle

In General:

The reverse duty cycle would differ from the cruise cycle in that the vehicle transmission would be shifted into reverse. Any mechanical drive would turn in the opposite direction and the directing and controlling means would direct power to the drive motors in the opposite direction, causing the vehicle to go backwards.

With Respect to the Various Components of the Drive System:

Power Unit 18: No change from forward position.

Axial Piston Pump 30: No change from forward position.

Forward/Reverse Valve 20: Shifting the transmission into reverse shifts the spools of the forward/reverse valves into reverse, diverting flow through the drive motors in the opposite direction. If the vehicle goes down hill in reverse or if the brake pedal is pressed in reverse, the valve spools will be shifted laterally to the left and fluid flow will temporarily be diverted to the accumulator.

Accumulator Output Directional Valve 28: The valve ports will not align and there will be no flow through the valve.

With respect to the hydraulic system of FIGS. 1–16, and with respect each wheel control unit 19, the forward reverse valve 20 and the accumulator output directional valve 28 will be seen to constitute a directional device for directing energy flow in the system and the spool 60 of valve 20, the piston 42 of pump 30, and the associated motor 20 will be seen to coact to provide a means of sensing wheel load or traction and wheel slippage.

Hydromechanical all Wheel Drive System

Figure 16:
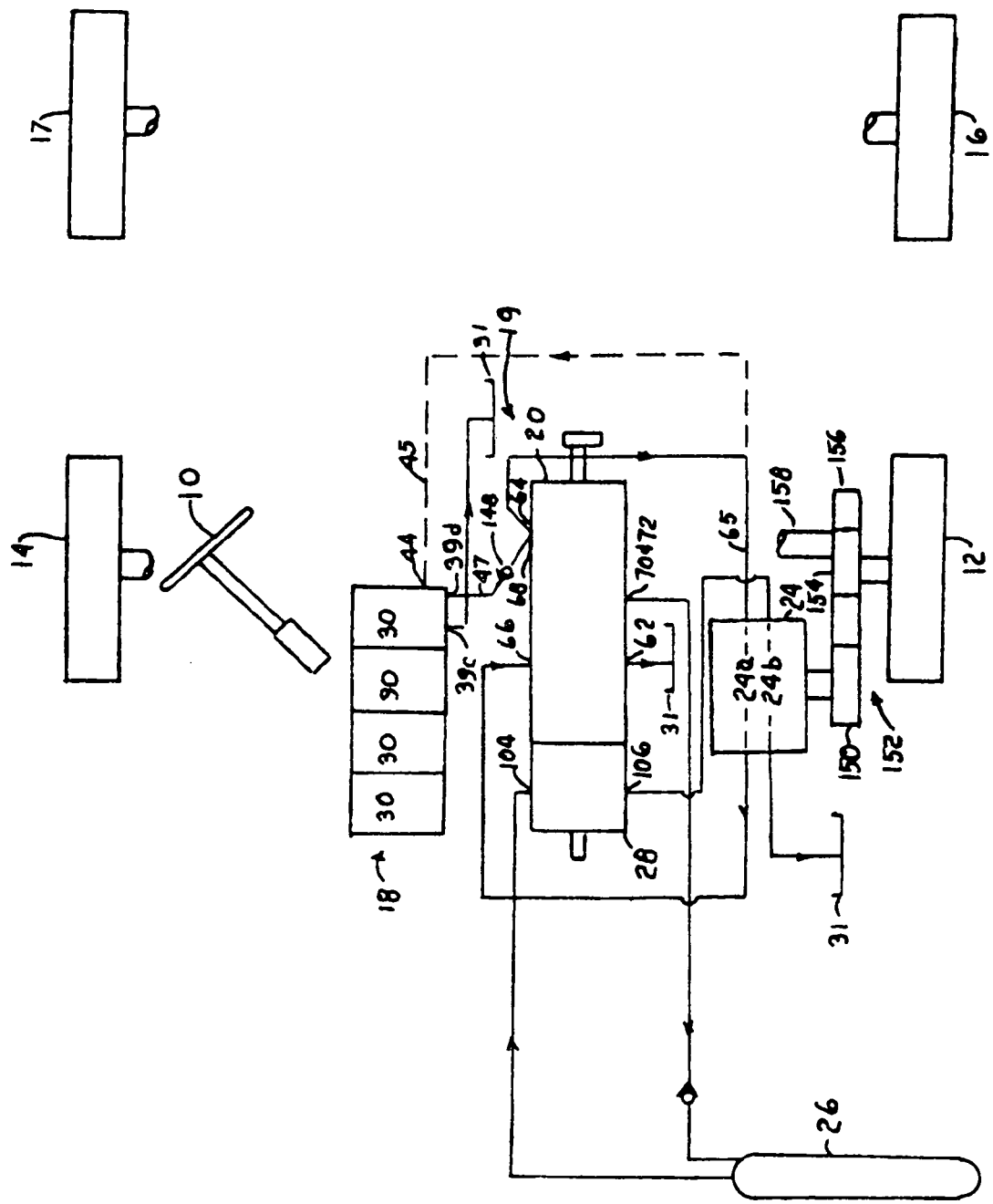
FIG. 16 is a block diagram of a hydromechanical all wheel drive system according to the invention.

The hydromechanical all wheel drive system seen in block diagram form in FIG. 16 is generally similar to the hydraulic all wheel drive system seen in FIGS. 1–15 with the exception that each output drive motor 24, rather than driving a vehicle wheel directly, drives the annulus 150 of a planetary gear set 152. Planetary gear set 152 further includes a sun gear 154 driving the associated wheel and a planet carrier 156 driven by an input shaft 158 which may be directly or indirectly connected to the engine 34 of the vehicle. It will be understood that in the hydromechanical drive system of FIG. 16, the motor 24 does not actually drive the vehicle wheel, but rather drives a planetary gear transmission to vary the amount of power going from the vehicle engine to the individual wheel.

Electrical all Wheel Drive System

Figure 17:
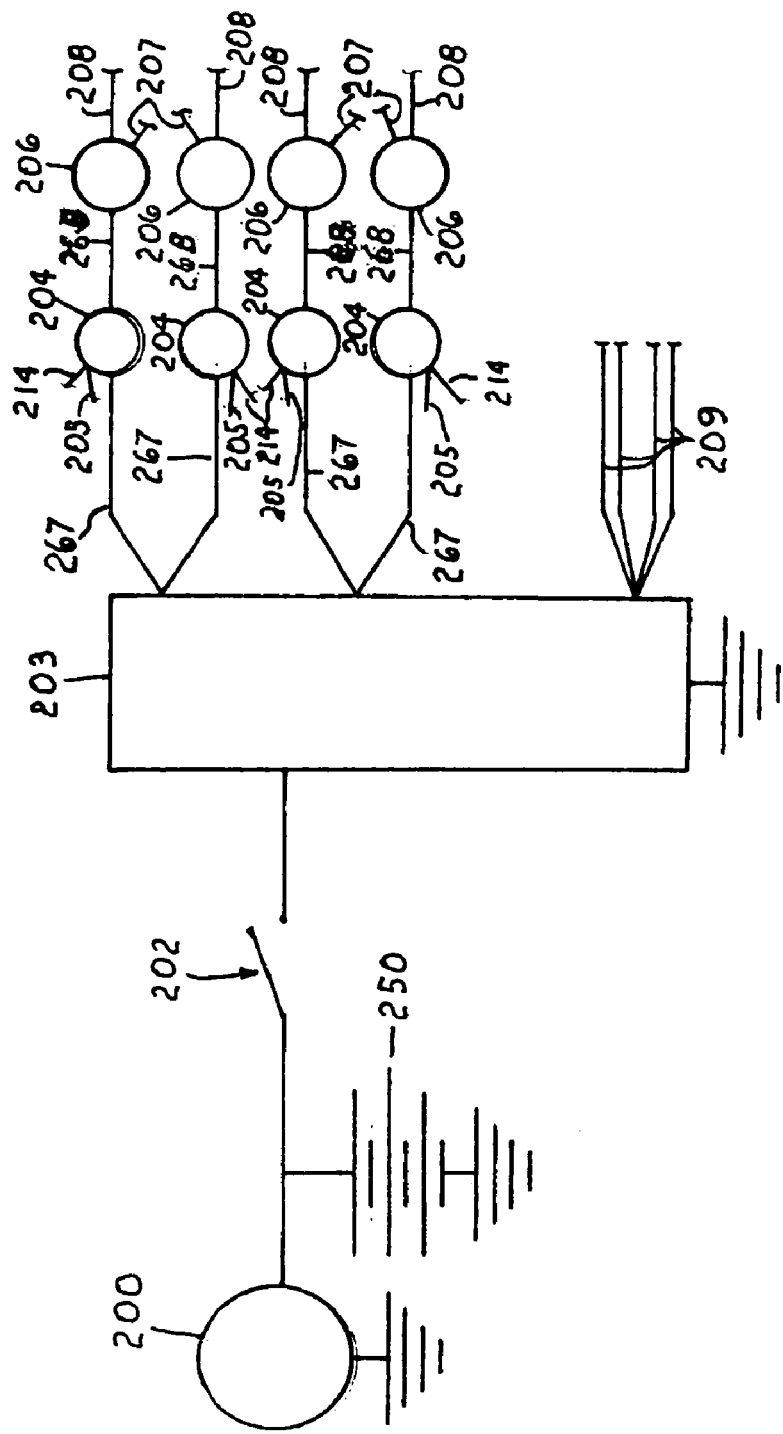
FIGS. 17, 18, and 19 are circuit diagrams of an electrical all wheel drive system according to the invention.
Figure 18:
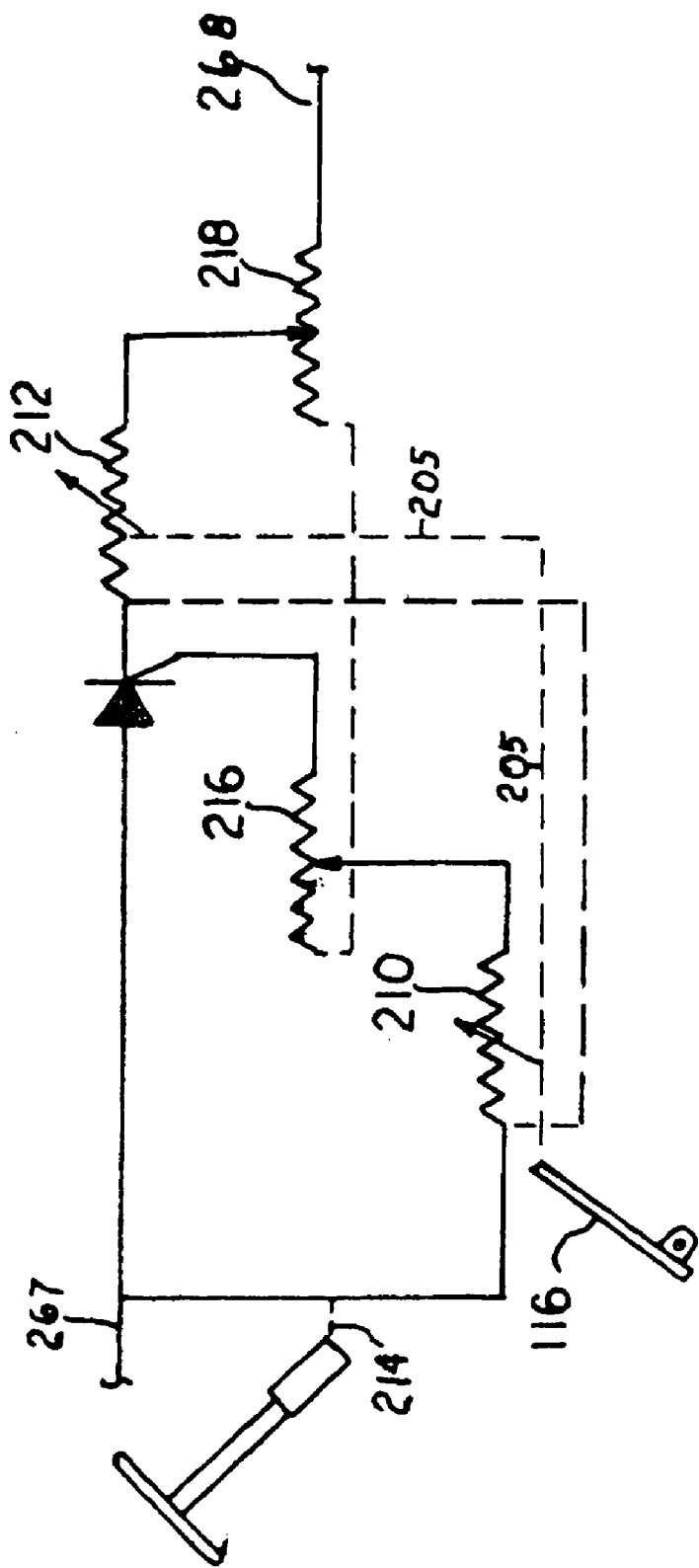
Figure 19:
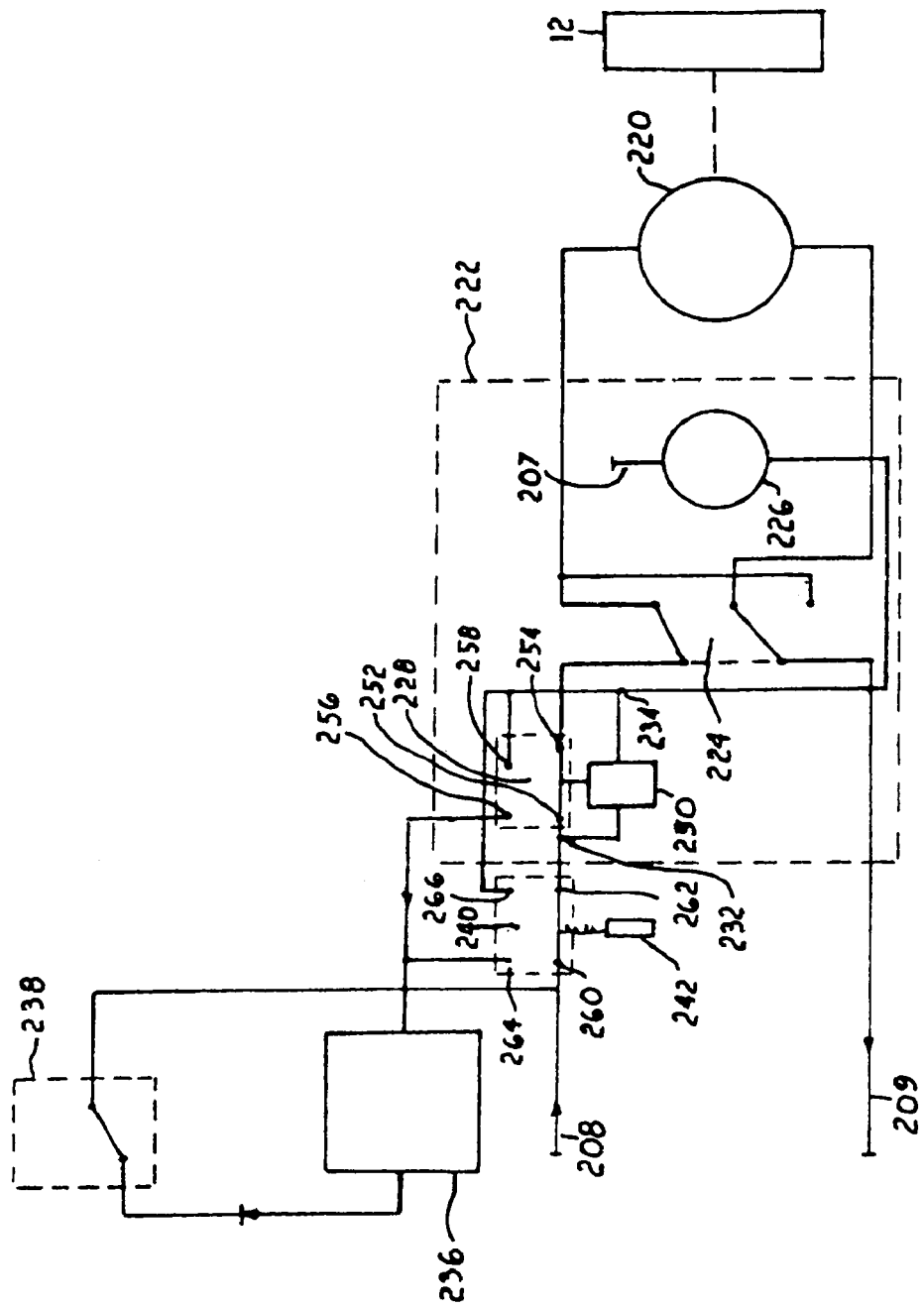

An electrical all wheel drive system is shown in FIGS. 17, 18, and 19. FIGS. 17 and 18 illustrate an electric power unit circuit and FIG. 19 illustrates an electric drive circuit.

Electric Power Circuit

In the electric power unit circuit seen in FIG. 17, 200 is a means of generating electrical energy such for example as an engine driven generator; 202 is a vehicle ignition switch connecting the output of the generator to a convertor 203; convertor 203 modifies the generated electrical energy by increasing its voltage, for example, and distributing that energy to circuits for the individual wheels; elements 204 are speed controllers such as silicone controlled rectifier circuits; line 267 connect convertor 203 to speed controller 204; lines 205 represent inputs from the vehicle accelerator 116 to speed controllers 204; elements 206 are DC tachometer speed controls; lines 268 connect element 204 to element 206; lines 207 are inputs to speed controls 206; lines 208 are connections to the electric drive circuit of FIG. 19; and lines 209 are return lines from the electric drive circuit of FIG. 19.

The accelerator inputs 205 include two resistances 210 and 212 (FIG. 18). Resistances 210 and 212 are the same for all speed controllers controlling the same size wheels on a vehicle and may be non-linear resistances or resistance modulation circuits to conform to different torque demands at different speeds. Resistances 210 and 212 have different initial settings. Resistance 210 determines the minium current flowing through the SCR 204, corresponding to a maximum resistance setting of 210, and therefore the minimum motor RPM. Resistance 212 determines the cut-off current for the SCR 204 and the maximum motor RPM. Resistance 212 is never decreased to 0.

Lines 214 (FIG. 17) represent inputs from the vehicle steering system to resistances 216 and 218 which are superimposed on the accelerator inputs 205 so that resistances 210 and 212 are additive and resistances 212 and 218 are additive. Resistances 216 and 218 are identical for any one wheel, but are mirror images for wheels on opposite sides of the vehicle and may be different for each axle, depending upon the steering geometry. The initial settings for resistances 216 and 218 are different, as with resistances 210 and 212, but they are coupled so that the difference between them remains constant.

Initial settings of resistances 210 and 212 and 216 and 218 determines the sensitivity of the controls. For steering systems with mechanically linkage, inputs for axle with wheels that steer are taken off the steering linkages. Inputs for non-steering axials are taken off the steering gear. For steering systems with fly-by wire steering, inputs are electrical or electronic.

Electric Drive Circuit

In the electric drive circuit of FIG. 19, the drive for one wheel is shown. The drives for the other wheels will be understood to be identical. With continued reference to FIG. 19, 208 is the input line from the respective tachometer speed control 206 of FIG. 17; 209 is the return line to the convertor 203 of FIG. 17; 220 is an electric drive motor, preferably a DC series motor (motor 220 can be connected directly to the respective wheel as shown in the hydraulic drive of FIG. 1 or combined with a mechanical drive through a gear set as shown in the hydromechanical drive of FIG. 16); 222 is a forward/reverse directional circuit assembly whose function corresponds to the forward/reverse valve 20 of the hydraulic system; 236 is an energy storage device whose function corresponds to the accumulator 26 of the hydraulic system (it may be a battery pack or a capacitor bank or other storage means and is used to store energy from motor 220 when that motor is in an overrunning condition and functioning like as generator); 238 is a switch operated off the vehicle shift linkage (it is closed when the shift linkage is in the forward position, as shown in FIG. 19, permitting discharge of energy storage device 236 to motor 220, otherwise it is open; it corresponds to the accumulator output directional valve 28 of the hydraulic system); 240 is a single pole double throw switch like switch 228; and 242 is a brake mechanism which actuates switch 240 (brake mechanism 242 comprises a small hydraulic cylinder whose piston is activated by hydraulic pressure when the vehicle brake pedal 118 is applied; switch 240 is normally constrained in the closed position, as shown, by spring force).

Forward/reverse directional circuit assembly 222 includes a three positioned forward/reverse switch 224 used to control the direction of current flow and the rotation of motor 220 (its positions are forward, open and reverse, it is controlled by the vehicle shift lever 93, and it is shown in the forward position in FIG. 19); a DC tachometer 226 connected to the drive shaft of motor 220 with an electrical connection 207 to speed control 206 as seen in FIG. 17; a single pole double throw switch 228 shown in a position of delivering power to motor 220; and a solenoid 230 controlling switch 228 and actuated by the potential difference between points 232 and 234 in the circuit. The solenoid 230 is lightly spring loaded so that it will be in the retracted position if the potential of 232 is equal to or greater than the potential at 234. In the circuit shown, point 232 will be at a higher potential than point 234 and solenoid 230 will be retracted.

Operation of Electric Drive System

Turning the vehicle ignition key closes the ignition switch 202 of FIG. 17 and releases the known vehicle interlock to allow the vehicle shift lever to be moved. Turning the key further starts the engine 34 and causes engine driven generator 200 to rotate and supply electrical energy. With switch 202 closed, generator output can flow to convertor 203 at the same voltage as a battery 250 interposed between generator 200 and ignition switch 202. Convertor 203 modifies the generator output and distributes it to the circuits for each wheel.

If the vehicle shift lever 93 is in either a park or neutral position, switch 224 will be opened and no current will flow to motor 220. However, if the vehicle shift lever 93 is placed in either a forward or reverse position, switch 224 will be closed in the position dictated by the shift lever.

Current will flow to speed controllers 204 where it will be established within the limits corresponding to the desired RPM of motors 220 as set by inputs 205 from the accelerator 116 and steering inputs 218. The current will then flow through DC tachometer speed controls 206 and via lines 208 to the electric drive circuits. Through line 208 for each electric drive circuit, current flows through switch 240, switch 228, and switch 224 to motor 220. Motor 220 will begin rotating in either a forward or reverse direction depending on the position of switch 224. Since DC tachometer 226 is connected to the shaft of motor 220 when motor 220 rotates, DC tachometer 226 will send a signal through line 207 to speed controller 206 for that circuit.

If the wheel to which motor 220 is connected has sufficient traction so that motor 220 does not begin to overrun, and if there are no changes in vehicle velocity, motor 220 will begin rotating at a constant RPM.

If the wheel does not have sufficient traction, so that its motor 220 deviates from the settings of speed controllers 204, DC tachometer 226 will send a signal to speed controller 206 which will modify the armature voltage of motor 220, and hence the torque output of the motor, to match the traction of the wheel, to maintain the motor speed at the desired setting.

If the accelerator setting is changed, altering the speed of the vehicle, the input 205 to speed controllers 204 will change the settings of resistors 210 and 212 of controllers 204 which will, in turn, alter the inputs to speed controllers 204 which will change the RPMs of motors 220.

If steering changes are made, inputs 218 to speed controllers 204 will change the settings of resistors 216 and 218 of controllers 204 which alter the inputs to controllers 206 which change the RPMs of motors 220. Those resistances associated with motors 220 for wheels on the inside of turns would increase, decreasing the RPMs of those motors. The resistances for motors 220 for wheels on the outside of turns would decrease, increasing the RPMs of those motors. Making steering changes while changing accelerator settings would combine the effects of the two actions.

When motor 220 begins to overrun, as when the vehicle is going downhill, motor 220 begins acting as a generator. The electrical potential at 234 becomes greater than the potential at 232 and solenoid 230 extends, shifting switch 228 from connections 252/254 to connections 256/258. The circuit from the electrical power unit to motor 220 is broken, and power ceases to flow to the motor. The circuit from motor 220 to storage device 236 is completed through connections 256/258 and motor 220, acting as a generator, charges storage device 236. The load caused by charging storage device 236 retards the rotation of motor 220, slowing the vehicle.

When motor 220 ceases to overrun, as when no longer going downhill, the potential at 234 goes toward zero. When it is less than or equal to the potential 232, solenoid 230 retracts, moving switch 228 back to connections 252/254 and re-establishing the circuit from the electric power unit to motor 220 which once again functions as a motor. If switch 224 is in the forward position, power to motor 220 will consist of the combined outputs of generator 200 and storage device 236, although output from the generator to motor 220 is still limited by speed controllers 204.

Applying the brake 118 causes the piston in brake cylinder 242 to move switch 240 from connections 260/262 to connections 264/266, interrupting the current flow to motor 220. Only a light brake pressure is required to move the piston in cylinder 242; a heavier pressure applies the brakes. The motion of the vehicle causes the motor 220 to rotate and begin acting as a generator, charging storage device 236 and retarding the rotation of motor 220 and the motion of the vehicle. When the brake pressure is released, the spring on cylinder 242 moves switch 240 back to connections 260/262, re-establishing the circuit from the electric power unit to motor 220.

The vehicle can be moved for short distances without the use of generator 200 if the storage device 236 is charged. Closing ignition switch 202 and shifting into forward closes switch 224 and 238 in the forward position. This allows motor 220 to be powered by storage device 236. In this mode, vehicle speed is controlled by manipulating brake pedal 118 so that energy flow from storage device 236 can be released to flow to motor 220 without actually applying the brakes.

The invention in all of the disclosed embodiments will be seen to provide an all wheel drive system in which slippage is effectively controlled and in which energy is effectively stored and delivered to optimize system efficiency.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle all wheel drive system for automatically providing maximum traction and efficiency without wheel slip, with regeneration and retardation for each individual wheel of the vehicle under all loading and driving conditions regardless of driving surface, characterized in that:

the system includes a drive motor for each wheel and means at each wheel operative to sense a loss of traction;

the system further includes a device for generating energy;

each motor receives energy from the generating device and drives a wheel of the vehicle;

the system further includes an energy storage device and a device for directing energy flow in the system;

the means at each wheel operative to sense a loss of traction comprises means for sensing wheel load and operative;

in response to sensed wheel load to direct energy from the energy generating device to the motor;

in response to a sensed loss of wheel load to reduce the energy supply to the motor and direct the motor energy discharged to the energy storage device; and in response to a sensed resumption of wheel load to direct regenerative energy from the energy storage device to the motor to assist in powering the motor;

each motor is further operative to provide forward and reverse propulsion; and the energy from the generating device is utilized to provide forward and reverse motor drive and the stored energy from the energy storage device is utilized to provide only forward motor drive only when the motor is directed to a forward drive mode and the motor is no longer overrunning.

2. A motor vehicle all wheel drive system for automatically providing maximum traction and efficiency without wheel slip, with regeneration and retardation for each individual wheel of the vehicle under all loading and driving conditions regardless of driving surface, characterized in that:

the system includes a drive motor for each wheel and means at each wheel operative to sense a loss of traction;

the system further includes a device for generating energy;

each motor receives energy from the generating device and drives a wheel of the vehicle;

the system further includes an energy storage device and a device for directing energy flow in the system;

the means at each wheel operative to sense a loss of traction comprises means for sensing wheel load and operative;

in response to sensed wheel load to direct energy from the energy generating device to the motor;

in response to a sensed loss of wheel load to reduce the energy supply to the motor and direct the motor energy discharged to the energy storage device; and in response to a sensed resumption of wheel load to direct regenerative energy from the energy storage device to the motor to assist in powering the motor;

each motor is further operative to provide forward and reverse propulsion;

the system further includes a brake actuated means for each motor operative to divert the output of the motor to the energy storage device and thereby retard the rotation of the motor.

3. A motor vehicle all wheel drive system according to claim 2 wherein:

the energy storage device comprises an accumulator;

the system further includes a tank; and fluid pressure from brake actuation is operative to divert motor discharge from the tank to the accumulator.

4. A motor vehicle all wheel drive system according to claim 2 wherein:

the device for generating energy is an electric generator driven by the motor vehicle engine connected to a convertor for modifying the generator output to a form suitable for the vehicle drive motors;

each motor comprises a reversible direct current series motor;

the energy storage device comprises either a battery pack or a capacitor bank;

loss of traction is sensed at each wheel by a DC tachometer circuit; and each circuit includes a switch operative to divert the output of the respective motor in an overrunning condition to the energy storage device with the switch being actuated by the potential difference across the motor.

5. A motor vehicle all wheel drive system according to claim 2 wherein:
each motor comprises an electric motor; and
the system includes a directional circuit assembly for each motor including a switch controlled by a vehicle shifting mechanism and operative to switch the motor between forward and reverse modes.

6. A motor vehicle all wheel drive system according to claim 4 wherein each circuit further includes a switch operative to release energy from the energy storage device to the respective motor only when the motor is in a forward mode and is no longer overrunning.

7. A motor vehicle all wheel drive system according to claim 4 wherein:
motor speed is varied by a silicon controlled rectifier circuit operated by input from the vehicle accelerator; and
the speed of each motor is further modified by input from the vehicle steering system superimposed on the accelerator input to vary the motor speed in proportion to the turning radius of the wheel powered by that motor when making a turn.

8. A motor vehicle all wheel drive system according to claim 4 wherein each circuit includes a further switch actuated by a brake of the vehicle and operative to direct the output of the respective motor to the energy storage device.

9. A motor vehicle all wheel drive system for automatically providing maximum traction and efficiency without wheel slip, with regeneration and retardation for each individual wheel of the vehicle under all loading and driving conditions regardless of driving surface, characterized in that:
the system includes a drive motor for each wheel and means at each wheel operative to sense a loss of traction;
the system further includes a device for generating energy comprising an engine driven axial piston pump providing fluid pressure and fluid rate independent of each other;
each motor receives energy from the generating device and drives a wheel of the vehicle;
the system further includes an energy storage device and a device for directing energy flow in the system;
the means at each wheel operative to sense a loss of traction comprises means for sensing wheel load and operative;
in response to sensed wheel load to direct energy from the energy generating device to the motor;
in response to a sensed loss of wheel load to reduce the energy supply to the motor and direct the motor energy discharged to the energy storage device; and
in response to a sensed resumption of wheel load to direct regenerative energy from the energy storage device to the motor to assist in powering the motor;
each motor comprising a balanced vane type hydraulic motor defining two separate chambers wherein generated pressurized fluid from the generating device is delivered to one chamber of each motor and stored pressurized fluid from the energy storage device is delivered to the other chamber of the motor;
loss of traction is sensed by a drop in system back pressure; and
the energy storage device comprises an accumulator for storing pressurized fluid.

10. A motor vehicle all wheel drive system according to claim 9 wherein the energy directing device includes a first valving device controlled by a vehicle shifting mechanism and operative to shift the fluid flow to the hydraulic motor between forward and reverse mode.

11. A motor vehicle all wheel drive system according to claim 9 wherein:
the system includes a tank; and
the energy directing device further includes a second valving device coupled to the first valving device and operative to direct the flow of pressurized fluid from the accumulator to the motor only when the first valving device is in forward mode and the fluid discharge is to tank.

12. A motor vehicle all wheel drive system according to claim 9 wherein:
each pump includes a yoke which is pinned at diametrically opposite ends with the yoke ends free to rotate about the pin connections;
one pinned end of the yoke is the center of a ball which is internally threaded and which is free to rotate relative to the yoke;
an adjusting screw is threadably received in the ball whereby rotation of the screw effects selective pivotal movement of the yoke; and
the other end of the yoke is connected to a lightly spring loaded piston subjected on one face to pump output pressure by way of an internal passage and subjected on an opposite face to motor input pressure by way of an external connection.

13. A motor vehicle all wheel drive system according to claim 12 wherein:
the rotational rate of the axial piston pump is varied in response to variations in the RPM of the vehicle engine;
each axial piston pump includes an electric motor driving the adjusting screw; and
the system further includes an electric motor modulating means operative in response to sensed variations in the vehicle steering angle to actuate the adjusting screw and thereby vary the flow rate of the associated axial piston pump.

14. A motor vehicle all wheel drive system comprising:
a generating device for supplying energy at a defined flow rate and a defined intensity;
a motor at each wheel of the motor vehicle receiving energy from the generating device and driving the respective wheel;
means for sensing the intensity of the energy arriving at each motor;
means operative in response to a sensed loss of energy intensity at a motor driving a particular wheel, indicative of a loss of traction at that wheel, to reduce the intensity of the energy supply to that motor from the generating device to a level matching the traction requirement of that wheel;
the generating device comprising a plurality of hydraulic pumps supplying pressurized fluid at a defined flow rate and defined pressure to the respective motors driving the respective wheels;
the sensing means comprising means sensing the pressure of the fluid arriving at each motor; and the operative means comprising means reducing the output pressure of a respective pump in response to a sensed loss of fluid pressure at the motor supplied by that pump.

15. A motor vehicle all wheel drive system for automatically providing maximum traction and efficiency without wheel slip, with regeneration and retardation for each individual wheel of the vehicle under all loading and driving conditions regardless of driving surface, characterized in that:

the system includes a device for generating energy, a drive motor for each wheel receiving energy from the generating device, means at each wheel operative to sense a loss of wheel traction, and means operative in response to a sensed loss of traction at a wheel to modify the output of the generating device in a sense to reduce the torque of the motor driving that wheel to match the traction of the wheel;

each drive motor comprises a hydraulic motor;

the means at each wheel operative to sense a loss of wheel traction comprises means operative to sense a loss of fluid inlet pressure to the drive motor for that wheel; and the means operative in response to a sensed loss of traction at a wheel comprises means operative to reduce the fluid output pressure of the generating device and thereby reduce the motor torque to match the loss of traction.

* * * * *